(12) United States Patent
Fieldman

(10) Patent No.: US 10,033,727 B1
(45) Date of Patent: *Jul. 24, 2018

(54) ACCOUNT SHARING DETECTION IN ONLINE EDUCATION

(71) Applicant: Study Social, Inc., Gainesville, FL (US)

(72) Inventor: Ethan Fieldman, Gainesville, FL (US)

(73) Assignee: STUDY SOCIAL, INC., Gainesville, FL (US)

( * ) Notice: Subject to any disclaimer, the term of this patent is extended or adjusted under 35 U.S.C. 154(b) by 143 days.

This patent is subject to a terminal disclaimer.

(21) Appl. No.: 15/064,255

(22) Filed: Mar. 8, 2016

Related U.S. Application Data

(60) Provisional application No. 62/151,858, filed on Apr. 23, 2015.

(51) Int. Cl.
G06F 7/04 (2006.01)
H04L 29/06 (2006.01)
G09B 5/02 (2006.01)

(52) U.S. Cl.
CPC .............. *H04L 63/083* (2013.01); *G09B 5/02* (2013.01)

(58) Field of Classification Search
CPC ............................... H04L 63/083; G09B 5/02
USPC .......................................................... 726/7
See application file for complete search history.

(56) References Cited

U.S. PATENT DOCUMENTS

| | | |
|---|---|---|
| 6,256,793 B1 | 7/2001 | Skopp |
| 6,652,287 B1 | 11/2003 | Strub |
| 6,988,138 B1 | 1/2006 | Alcorn |
| 8,352,876 B2 | 1/2013 | Batarseh |
| 8,661,461 B1 | 2/2014 | Maurer |
| 9,021,607 B2 | 4/2015 | Chavez |
| 9,292,866 B2 | 3/2016 | Allaire |
| 9,483,805 B1 | 11/2016 | Fieldman |
| 9,560,034 B1 | 1/2017 | Fieldman |
| 9,842,218 B1 | 12/2017 | Brisebois |
| 2003/0208763 A1 | 11/2003 | McEihatten |

(Continued)

FOREIGN PATENT DOCUMENTS

WO     WO-0129733     4/2001

OTHER PUBLICATIONS

U.S. Appl. No. 15/064,207, Ethan Fieldman, filed Mar. 8, 2016.

(Continued)

*Primary Examiner* — Mohammad W Reza
(74) *Attorney, Agent, or Firm* — Beyer Law Group LLP

(57) ABSTRACT

An education application delivers educational content including videos and documents to any computing device of a user via a student account. Each video or document is associated with a course and a corresponding course code. A database lists those courses and course codes that are incompatible with one another. A University database lists courses that a student is currently enrolled in. Course codes for educational content delivered via a student account are compared to either database. Access by the student account is blocked if any course codes for delivered content are incompatible with either database. Another database records videos watched via a student account. If a threshold number of relatively long videos are watched in a short time period then access by the student account is blocked. If a student account begins a second video before the first is finished then access is blocked. Content is hidden if not relevant.

16 Claims, 13 Drawing Sheets

(56) References Cited

U.S. PATENT DOCUMENTS

| | | |
|---|---|---|
| 2005/0144297 A1 | 6/2005 | Dahlstrom |
| 2006/0129458 A1 | 6/2006 | Maggio |
| 2006/0195604 A1 | 8/2006 | Goodman |
| 2006/0253324 A1 | 11/2006 | Miller |
| 2008/0140849 A1 | 6/2008 | Collazo |
| 2008/0168515 A1 | 7/2008 | Benson |
| 2008/0189617 A1 | 8/2008 | Covell |
| 2009/0083048 A1 | 3/2009 | Mandelbaum |
| 2009/0083777 A1 | 3/2009 | St. John-Larkin |
| 2010/0050199 A1 | 2/2010 | Kennedy |
| 2010/0083322 A1 | 4/2010 | Rouse |
| 2010/0228613 A1 | 9/2010 | Anderson |
| 2010/0251386 A1 | 9/2010 | Gilzean |
| 2010/0325737 A1 | 12/2010 | Fahn |
| 2011/0145908 A1 | 6/2011 | Ting |
| 2011/0166918 A1 | 7/2011 | Allaire |
| 2011/0208616 A1 | 8/2011 | Gorman |
| 2011/0236872 A1 | 9/2011 | Taylor |
| 2011/0247081 A1 | 10/2011 | Shelton |
| 2011/0306027 A1 | 12/2011 | Bridges |
| 2012/0054118 A1* | 3/2012 | Griffin .................... G06Q 10/10 705/327 |
| 2012/0272336 A1 | 10/2012 | Cohen |
| 2012/0304265 A1 | 11/2012 | Richter |
| 2013/0004929 A1 | 1/2013 | Otwell |
| 2013/0060661 A1 | 3/2013 | Block |
| 2013/0152221 A1 | 6/2013 | Yin |
| 2013/0191928 A1 | 7/2013 | Yin |
| 2014/0038157 A1 | 2/2014 | Karpoff |
| 2014/0103306 A1 | 4/2014 | Moon |
| 2014/0128557 A1 | 5/2014 | Giesbrecht |
| 2014/0157371 A1 | 6/2014 | Le Chevalier |
| 2014/0188937 A1 | 7/2014 | Kiefer |
| 2014/0201527 A1 | 7/2014 | Krivorot |
| 2014/0214503 A1 | 7/2014 | Chircorian |
| 2014/0279128 A1 | 9/2014 | Sagebin |
| 2014/0282923 A1 | 9/2014 | Narayan |
| 2014/0380509 A1 | 12/2014 | Homer |
| 2015/0082461 A1 | 3/2015 | Meredith |
| 2015/0170535 A1* | 6/2015 | Negash .................... G09B 5/10 434/350 |
| 2015/0193651 A1 | 7/2015 | Gleim |
| 2015/0213236 A1 | 7/2015 | Gorodyansky |
| 2015/0262496 A1 | 9/2015 | Cook |
| 2015/0288692 A1 | 10/2015 | Wei |
| 2015/0326583 A1 | 11/2015 | Kouno |
| 2017/0140658 A1 | 5/2017 | Aluvala |

OTHER PUBLICATIONS

U.S. Appl. No. 15/639,740, Ethan Fieldman, filed May 26, 2016.
U.S. Appl. No. 15/893,239, Ethan Fieldman, filed Jun. 30, 2017.
U.S. Appl. No. 15/724,442, Ethan Fieldman, filed Feb. 9, 2018.
Unknown author, (Mar. 25, 2015). Snapshot of Coursehero.com. Retrieved from https://web.archive.org/web/20150325180238/https://www.coursehero.com/ on Oct. 2, 2017.
Unknown author, (Dec. 2, 2014). Snapshot of Coursehero.com login page. Retireved from https://web.archive.org/web/20141202015424/https://www.coursehero.com/login.php on Oct. 2, 2017.
Ridley, M., "Lights, Tokens, Action!:" Sun, London, p. 24, Jun. 19, 2001.
Netflix—Unlimited TV Shows & Movies: How Does It Work? Article dated Sep. 23, 2011 via Internet Archive (3 pages) http://web. archive.org/web/20110923163827/http://www.netflix.com:80/HowItWorks.
Scott, Jeremy. "Netflix to Begin Enforcing One Stream Per Customer Rule" Published Sep. 7, 2011 (15 pages) http://tubularinsights.com/netflix-one-stream/.
Martin, David W. Netflix Adds a New Restriction: Limits Customers to One Stream at a Time Published Sep. 6, 2011 (10 pages) https://www.cultofmac.com/112468/netflix-adds-a-new-restriction-limits-customers-to-one-stream-at-a-time/.
Northcutt, Curtis G., Andrew D. Ho, and Isaac L. Chuang. "Detecting and preventing "multiple-account" cheating in massive open online courses." Computers & Education 100 (2016): 71-80.
Tuttle, Brad. "The Real Rules for Sharing Passwords at HBO Now, Netflix, Amazon Prime, and Hulu" Published Sep. 21, 2015 (4 pages) http://time.com/money/4043147/hbo-netflix-amazon-prime-share-account-password/.
"Managing Authentication—MoodleDocs" article published Mar. 18, 2016 (6 pages) https://docs.moodle.org/29/en/index.php?title=Managing_authentication&printable=yes.
William H. Rice IV. "Moodie E-learning Course Development: A complete guide to successful learning using Moodie" Published May 2006 (252 pages total).
Swett, C., "Play It Again, Zune: Microsoft's Portable Music Device Is Much Superior to last year's Model, but It Still Falls Short of Industry Leader iPod," McClatchy—Tribune Business News, Nov. 13, 2007.
Yuen-C, T., "High Rollers, but in a Virtual World," McClatchy—Tribune Business News, Oct. 28, 2010.
Https://scholar.google.com/scholar Controlling account access to streaming content based . . . -Google Scholar (2 pages).
Https://scholar.google.com/scholar Limiting user success to a maximum number of content (2 pages).

* cited by examiner

Authentication System

|  | 404 | 408 | 412 | |
|---|---|---|---|---|
| AL | AM | AN | AO | |
| UID | Subject 1 | Subject 2 | Subject 3 | |
| 730304327 | Biochemistry | Finance | | |
| 1474366468 | Statistics 1 | Physics 2 without Calc | | |
| 536521373 | Physics 2 without Calc | Organic Chemistry 2 | | |
| 1230218142 | Physics 2 without Calc | Organic Chemistry 2 | | |
| 1107201556 | Biochemistry | Physics 2 without Calc | | |
| 1017162636 | Biochemistry | Physics 2 without Calc | | |
| 1E+14 | Calculus 2 | Physics 1 with Calc | | |
| 1754116791 | Physics 2 without Calc | Organic Chemistry 1 | | |
| 1569593100 | Organic Chemistry 2 | Physics 1 without Calc | | |
| 1581655093 | Macroeconomics | Business Calc 1 | | |
| 1026768559 | Organic Chemistry 2 | Physics 1 without Calc | | |
| 578274895 | Organic Chemistry 2 | Statistics 2 | | 420 |
| 1729693351 | Physics 2 without Calc | Physics 1 with Calc | | |
| 797207936 | Calculus 2 | Physics 1 with Calc | | |
| 611611034 | Physics 2 without Calc | Organic Chemistry 2 | | |
| 620259389 | Physics 1 with Calc | Calculus 3 | | 422 |
| 519057599 | Managerial Accounting | Financial Accounting | | |
| 1E+14 | Calculus 1 | General Chemistry 1 | | |
| 658323267 | Physics 2 without Calc | Organic Chemistry 1 | | |
| 688674922 | Financial Accounting | Microeconomics | | |
| 520784755 | Physics 1 without Calc | Managerial Accounting | | |
| 1417434880 | Business Statistics | Operations Management | | |
| 1E+14 | Calculus 3 | Physics 2 with Calc | | 424 |
| 1544102926 | Organic Chemistry 1 | Precalculus | | |
| 559759487 | Calculus 3 | Physics 2 with Calc | | |
| 1.00003E+14 | Statistics 1 | Physics 2 with Calc | General Chemistry 2 | |

Microsoft Internet Explorer

File  Edit  View  Go  Tools  Help http://app.facebook.com/studyedge-staging/admin/tools

My Online Services
▸ Transcripts
▾ My Record
  Academic Programs
  Cumulative Hrs
  Certificates/Degree Application
  Verify Degree
  Verify Enrollment
  Enrollment Request
  Final Grades
  Holds
  Petition Status
  Test Scores
  Update Emergency Contact Info
▸ Placement
▾ Degree Audit
  Degree Audit
  Degree Shopping
  Excess Hours
  Surcharge
  Trading Audit
▸ e-Learning
▸ Evaluations

SPRING SCHEDULE

Log out

▸ Personal Information
Your Schedule - Spring 2015

| Section | Type | Course | Credits | Days | Periods | Bldg | Room |
|---------|------|--------|---------|------|---------|------|------|
| OSFD | X | PUR4800 | 03 | R | 5-7 | FLG | 210 |
| 2014 | X | COM1465 | 03 | Time to be arranged | | | |
| | | | | T | 8-9 | WEIM | 1064 |
| 2701 | X | MMC4200 | 03 | R | 9 | WEIM | 1064 |

Total Credits: 009               462                    460

View Campus Map w/My Schedule
Show My E-Learning Links- lets you know if your classes use Sakai or Canvas E-Learning tools
Export My Schedule in ICalendar *.ics) format View your Weekly Planner Schedule
You may print this page as a receipt

My Resources
▾ Academic Info
  Academic Learning Compacts, by Major
  Alcohol Education Tutorial
  Calendars/Deadlines
  Catalog-Undergrad
  Combined Degree
  Course Evaluations
  Distant Ed Courses
  Exam Schedules
  Forms-Registrar
  Prestigious National Scholarships
  Schedule of Courses
  Study ?? Ops
  Ugrad Experinces
▸ Advising Info
▸ Financial Info
▸ Grad Student Info
▸ Personal Info
▸ Other Info
  FAQs

FIG. 8

Microsoft Internet Explorer

File  Edit  View  Go  Tools  Help http://app.facebook.com/studyedge-staging/admin/tools My Online Services | ▸ Personal Information
▸ Transcripts | Weekly Schedule
▾ My Record
　Academic Programs
　Cumulative Hrs
　Certificates/Degree
　　Application
　Verify Degree
　Verify Enrollment
　Enrollment Request
　Final Grades
　Holds
　Petition Status
　Test Scores
　Update Emergency
　　Contact Info
　▸ Placement
　▾ Degree Audit
　　Degree Audit
　　Degree Shopping
　　Excess Hours
　　Surcharge
　　Trading Audit
　▸ e-Learning
　▸ Evaluations Student Schedule
Registered for 009 credits

| Per | Monday | Tuesday | Wednesday | Thursday | Friday |
|---|---|---|---|---|---|
| 1  7:25 | | | | | |
| 2  8:30 | | | | | |
| 3  9:35 | | | | | |
| 4  10:40 | | | | | |
| 5  11:45 | | | | | |
| 6  12:50 | | | MMC4200 Section: 2701 | | |
| 7  1:55 | | | MMC4200 Section: 2701 | | |
| 8  3:00 | | | | PUR4800 Section: O5FD | |
| 9  4:05 | | | | PUR4800 Section: O5FD | |
| 10 5:10 | | | | PUR4800 Section: O5FD | |
| 11 6:15 | | | | MMC4200 Section: 2701 | |
| E1 7:20 | | | | | |
| E2 8:20 | | | | | |
| E3 9:20 | | | | | |
| TO ARRANGE | COM3465 Section: 2014 | | | | |

472

My Resources
▾ Academic Info
　Academic Learning
　Compacts, by Major
　Alcohol Education
　　Tutorial
　Calendars/Deadlines
　Catalog-Undergrad
　Combined Degree
　Course Evaluations
　Distant Ed Courses
　Exam Schedules
　Forms-Registrar
　Prestigious National
　　Scholarships
　Schedule of Courses
　Study ?? Ops
　Ugrad Experinces
▸ Advising Info
▸ Financial Info
▸ Grad Student Info
▸ Personal Info
▸ Other Info
　FAQs

470

| Timestamp | Facebook ID | First Name | Last Name | Email | School | Video/PDF Name | File Type | # Tokens used on this Video/PDF | # of Total Tokens Remaining | Access Type |
|---|---|---|---|---|---|---|---|---|---|---|
| 4/14/15 15:23:54 | 1.43E+09 | | | | University of | PHY2054-Exam 3 Session 9 Rev | Big Video | 15 | 55 | facebook |
| 4/14/15 15:13:49 | 1E+14 | | | | University of | MAC2234-Exam 3 Review Part 2 | Big Video | 15 | 70 | facebook |
| 4/13/15 15:22:07 | 1.31E+09 | | | | University of | PHY2049-Exam 1 Review Part 2 | Big Video | 15 | 40 | android |
| 4/12/15 15:19:52 | 1E+14 | | | | University of | MAC2311-Exam 3 Part 2 Review | Big Video | 15 | 140 | facebook |
| 4/8/15 15:23:53 | 1E+14 | | | | University of | CHM2046 Toth Exam 3 Review V | Big Video | 15 | 74 | facebook |
| 4/1/15 15:20:22 | 1E+14 | | | | University of | CHM2045-Exam 3 Review Part 2 | Big Video | 15 | 55 | facebook |
| 4/1/15 15:19:39 | 1E+14 | | | | University of | CHM2045-Exam 3 Review Part 2 | Big Video | 15 | 70 | facebook |

FIG. 11

| Timestamp | Facebook ID | First Name | Last Name | School | Membership Level | Video/PDF Name | File Type | # Tokens used on this Video/PDF | # of Total Tokens Remaining | Facebook/ iPhone/ iPad/ Android |
|---|---|---|---|---|---|---|---|---|---|---|
| 4/14/2015 01:49:46 PM | 2059 | Kenny | | University of Florida | All | Business Calc 2 - MAC2234 - Exam 3 Review Part 2 (1-2 HOUR Video, requires 15 tokens) - http://videos.studyedge.com/bigvideo/04April/04-12-15/MAC2234_exam_3_Review_part_2.mp4 | Big Video | 15 | 55 | facebook |
| 4/14/2015 01:42:03 PM | 2059 | Kenny | | University of Florida | All | Business Calc 2 - MAC2234 - Exam 3 Review Part 1 (1-2 HOUR Video, requires 15 tokens) - http://videos.studyedge.com/bigvideo/04April/04-12-15/MAC2234_exam_3_Review_part_1.mp4 | Big Video | 15 | 85 | facebook |
| 4/14/2015 01:36:25 PM | 2059 | Kenny | | University of Florida | All | Calculus 2 - MAC2312 - Exam 3 Review Part 1 (1-2 HOUR Video, Requires 15 tokens) - http://videos.studyedge.com/bigvideo/04April/04-13-15/MAC2312_Exam_3_Review_part_1.mp4 | Big Video | 15 | 100 | facebook |

*FIG. 12*

ACCOUNT SHARING DETECTION IN ONLINE EDUCATION

CROSS-REFERENCE TO RELATED APPLICATIONS

This application claims priority of U.S. provisional patent application No. 62/151,858, filed Apr. 23, 2015, entitled "ACCOUNT SHARING DETECTION AND PREVENTION IN ONLINE EDUCATION," which is hereby incorporated by reference.

This application is related to U.S. patent application Ser. Nos. 15/064,207, 15/064,292 filed on the same date herewith, entitled "ACCOUNT SHARING PREVENTION IN ONLINE EDUCATION" and "LIMITED TOKENS AND LIMITED VIEWING TIME IN ONLINE EDUCATION," which are hereby incorporated by reference.

FIELD OF THE INVENTION

The present invention relates generally to online education. More specifically, the present invention detects account sharing and other fraud in online education.

BACKGROUND OF THE INVENTION

Online education is a very promising approach to education and is primarily based upon the use of computers and mobile devices for learning, in addition to the use of other more traditional resources. Individual user accounts for students are often used to provide access, to track payments, to track progress, etc., but can be ripe for fraud. For example, students may attempt to share another student's account when each student preferably should use his or her own account. In other words, a student shares his or her valid account with another student who has not signed up nor paid for the service. Or, a number of students might attempt to share a fictitious account.

Account sharing is problematic and detrimental to learning, as account sharing creates a disincentive for the education provider to produce high quality material (due to the monetary pressures of server costs, curriculum specialists, programming time, etc.) and makes it costly for the education provider to continue to provide high-quality, high-time investment resources to students. This account sharing can lead to a proliferation, for instance, of subpar or generalized material. The cost of producing high quality, specialized material is high, and account sharing makes it untenable for education providers to continue to provide resources at a high level. This leads to a "race to the bottom," in which education providers offer generalized material or material that does not involve significant monetary or time investment on the part of the education provider. This, in turn, affects the student, as the student will no longer receive the high quality service she or he initially anticipated. Furthermore, sharing accounts makes it difficult for the student to benefit from data-driven analytics that suggest the proper material or courses for a student, given the student's usage of the material and the student's performance. The student's learning experience is degraded and does not benefit from the strengths of online education, namely, personalization and quality of content.

In particular, it can be beneficial to detect account sharing after it occurs, assuming that some amount of sharing will occur. Accordingly, improved techniques and systems are desired.

SUMMARY OF THE INVENTION

To achieve the foregoing, and in accordance with the purpose of the present invention, an online education system is disclosed that detects account sharing using various techniques.

In a first embodiment, logging into a student account is detected from two or more different computing devices. Course codes for educational content delivered to each computing device are recorded. These course codes are compared to a database of incompatible course codes. If course codes are incompatible then the student account is blocked from viewing any additional educational content.

In a second embodiment, educational content having a first course code is delivered to a computing device log in using a student account. This course code is compared to a University database listing course codes in which a student is enrolled. If course codes are incompatible, then the student account is blocked from viewing any additional educational content.

In a third embodiment, a database of an education application keeps track of all videos and related information that have been watched by students via their student accounts. The application predetermines a threshold number of videos, a minimum video length, and a time period. The database is reviewed and if the threshold number of videos (each having a minimum video length) have been watched via a single student account in the predetermined time period then access by the student account to further educational content is blocked.

In a fourth embodiment, the education application tracks in real time videos that are initiated via a student account. The application predetermines a threshold number of videos, a minimum video length, and a time period. If the threshold number of videos (each having a minimum video length) are being watched via a single student account in the predetermined time period then access by the student account to further educational content is blocked.

In a variation on the third and fourth embodiments, if a second video is initiated via the student account before a first video currently being watched is completed via the same student account, then access is blocked.

BRIEF DESCRIPTION OF THE DRAWINGS

The invention, together with further advantages thereof, may best be understood by reference to the following description taken in conjunction with the accompanying drawings in which:

FIG. 4 is an example database of classes that may not or should not be taken together.

FIG. 7 is an example from a school database showing a student's schedule.

FIG. 8 is another example from a school database showing a student's schedule.

FIG. 11 a screenshot of a database of a report of videos watched in various student accounts.

FIG. 12 is a screenshot of a database of an example of a student who was caught watching three videos in a one-hour time frame.

DETAILED DESCRIPTION OF THE INVENTION

Although embodiments of the invention may be used in a variety of contexts, in one specific context online education is promoted and managed by an education company via a Web site or a mobile application accessible from any computer or mobile device. A student seeking educational assistance with K-12 school or college coursework or with standardized tests (e.g., GRE, LSAT, MCAT, etc.), using resources such as videos, electronic documents, printed documents, live review sessions, one-on-one consultations with tutors, etc.) uses the Web site or mobile application to sign up or log in to a student account. Access to the relevant content is then provided via an education application hosted on a server computer.

Block Diagrams

Figure 1:
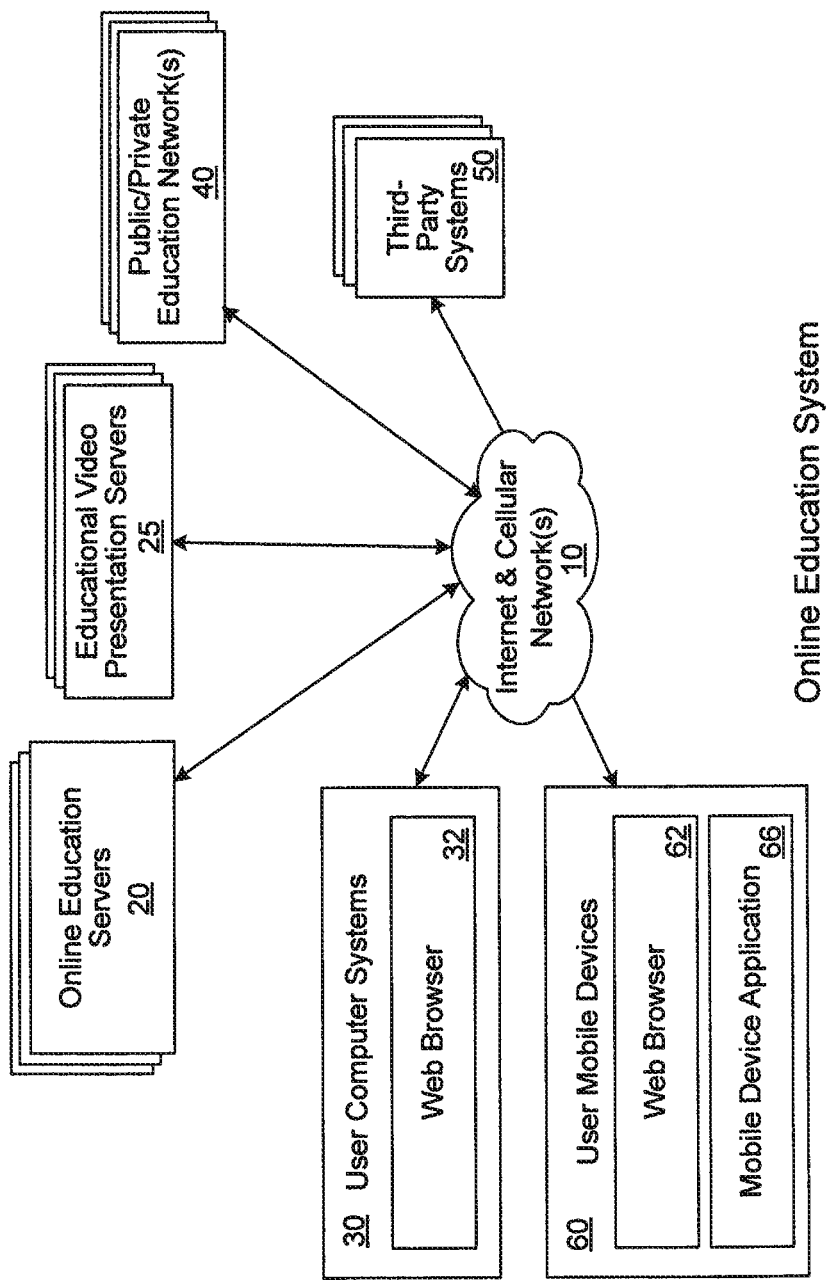
FIG. 1 is a simplified block diagram of a specific embodiment of an online education system.

FIG. 1 is a simplified block diagram of a specific embodiment of an online education system 1, which may be implemented via a computerized data network to provide the service of the education company. As described in greater detail herein, different embodiments of system 1 may be configured to provide various different types of functionalities generally relating to online education. As shown, system 1 may include one or more of the following types of computers, systems, networks, Web sites, databases, mobile devices, etc.

Online education servers 20 perform and implement various types of functions, operations, actions, and other features such as those described herein. Educational video presentation computer servers 25 include videos of educational courses, videos of tutors presenting review materials, etc., all used by students who have access to system 1. Public/private education networks 40, include, for example, student information systems, student data management systems, course management systems, etc., used by schools, colleges, and universities.

User computer systems 30 include any suitable desktop, laptop, tablet computers, etc., operable to provide the various types of online education described herein. User mobile devices 60 include any suitable mobile telephone, personal digital assistant, etc., operable to provide the various types of online education described herein. Internet and cellular networks 10 include suitable wired or wireless networks used for communication between the entities of system 1. Third-party systems 50 include computer servers, Web sites, software, etc. of social media company sites such as Facebook, Twitter, Instagram, LinkedIn, etc.

Figure 2:
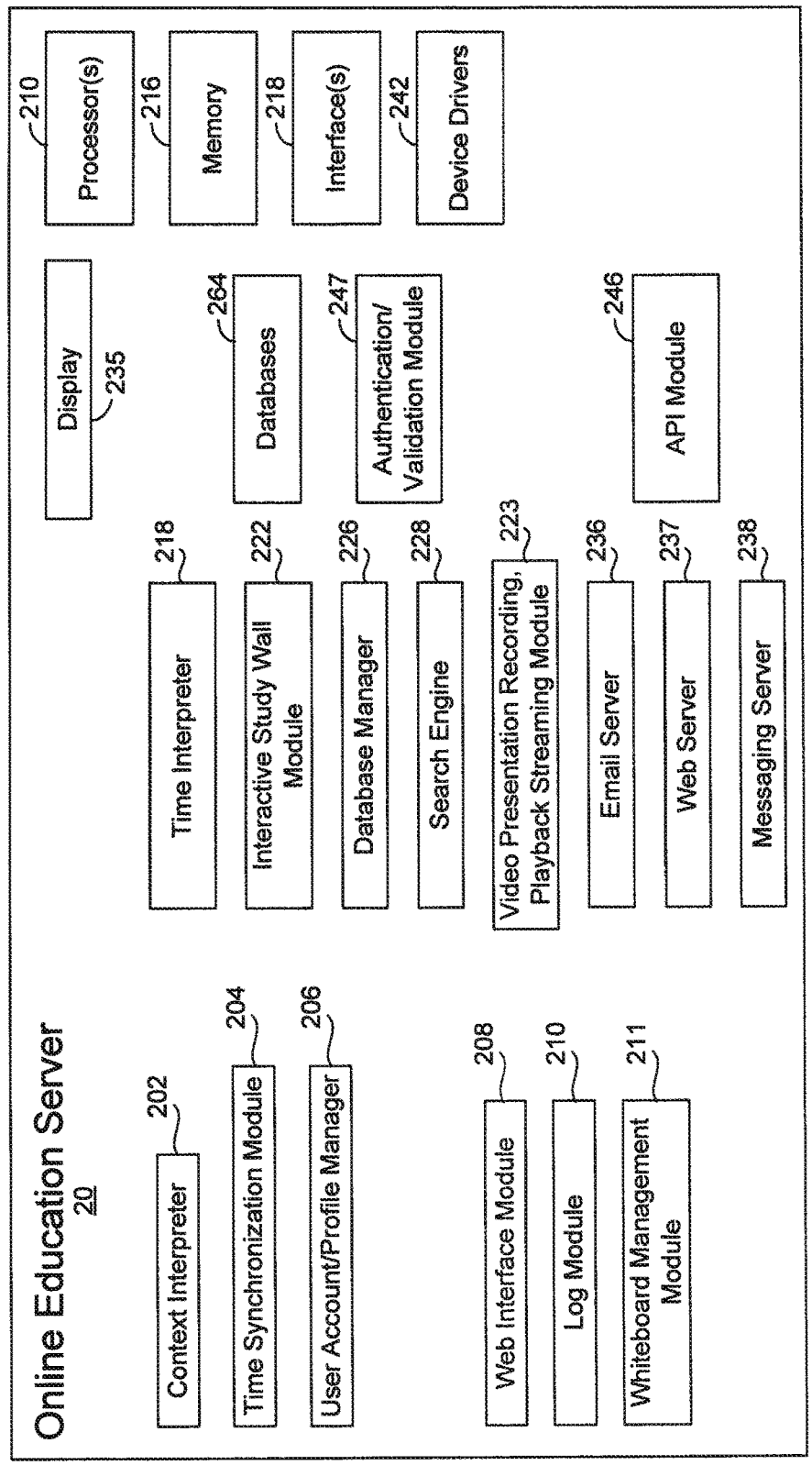
FIG. 2 is a block diagram of software modules and hardware components of an online education computer server in accordance with a specific embodiment.

FIG. 2 is a block diagram of software modules and hardware components of an online education computer server 20 in accordance with a specific embodiment. These modules and components may be implemented upon a single computer or upon multiple computers in communication with one another.

Context interpreter 202 is operable to analyze contextual criteria relating to a detected set of events and automatically determine or identify one or more contextually appropriate responses based on the contextual interpretation of the detected events. Contextual criteria include: location-based criteria; time-based criteria; identity of a user; user profile information; transaction history information; recent user activities; and proximate business-related criteria. Time synchronization module 204 is operable to manage universal time synchronization (e.g., via NTP or GPS). Search engine 228 is operable to search for transactions, logs, items, accounts, or options in the online education system databases. Time interpreter 218 is operable to modify or change identifier activation and expiration times based on various criteria such as time, location, transaction status, etc.

Authentication/validation module 247 includes user identifiers, passwords, software/hardware identifiers, SSL certificates, etc., which are operable to perform various types of authentication and validation tasks such as: verifying/authenticating devices, verifying/authenticating users, verifying passwords, passcodes, SSL certificates, biometric identification information and/or other types of security-related information, and verifying/validating activation or expiration times, etc.

Interactive study wall module 222 is operable to implement various types of wall functions such as allowing a user to post text and images to a wall, or to read postings on a wall. White board management module 211 is operable to perform various types of electronic whiteboard functions. Video presentation recording, playback, streaming module 223 is operable to facilitate, enable, initiate, and perform one or more of the operations relating to the video presentation techniques described herein. Database manager 226 is operable to handle various tasks relating to database updating, database management, database access, etc.

Log module 209 is operable to generate and manage transactions history logs, system errors, connections from APIs, etc. Web interface module 208 is operable to facilitate and manage communications and transactions with other Web portals. API module 246 is operable to facilitate and manage communications and transactions with other APIs of other systems or networks.

Processor 210 may include one or more commonly known CPUs, which are deployed in many of today's computers and consumer electronic devices. Memory 216 may include volatile memory (e.g., RAM), non-volatile memory (e.g., disk memory, FLASH memory, EPROMs, etc.), unalterable memory, and other types of memory. Interface 218 includes wired or wireless interfaces. Device drivers 242 includes functionality similar to one or more computer system driver devices generally known to one having ordinary skill in the art. One or more displays 235 may be implemented using, for example, LCD display technology, or other types of conventional display technology.

E-mail Server 236 provides various functions and operations relating to e-mail activities and communications. Web server 237 provides various functions and operations relating to Web server activities and communications. Messaging server 238 provides various functions and operations relating to text messaging or other social network messaging activities and communications.

Figure 3:
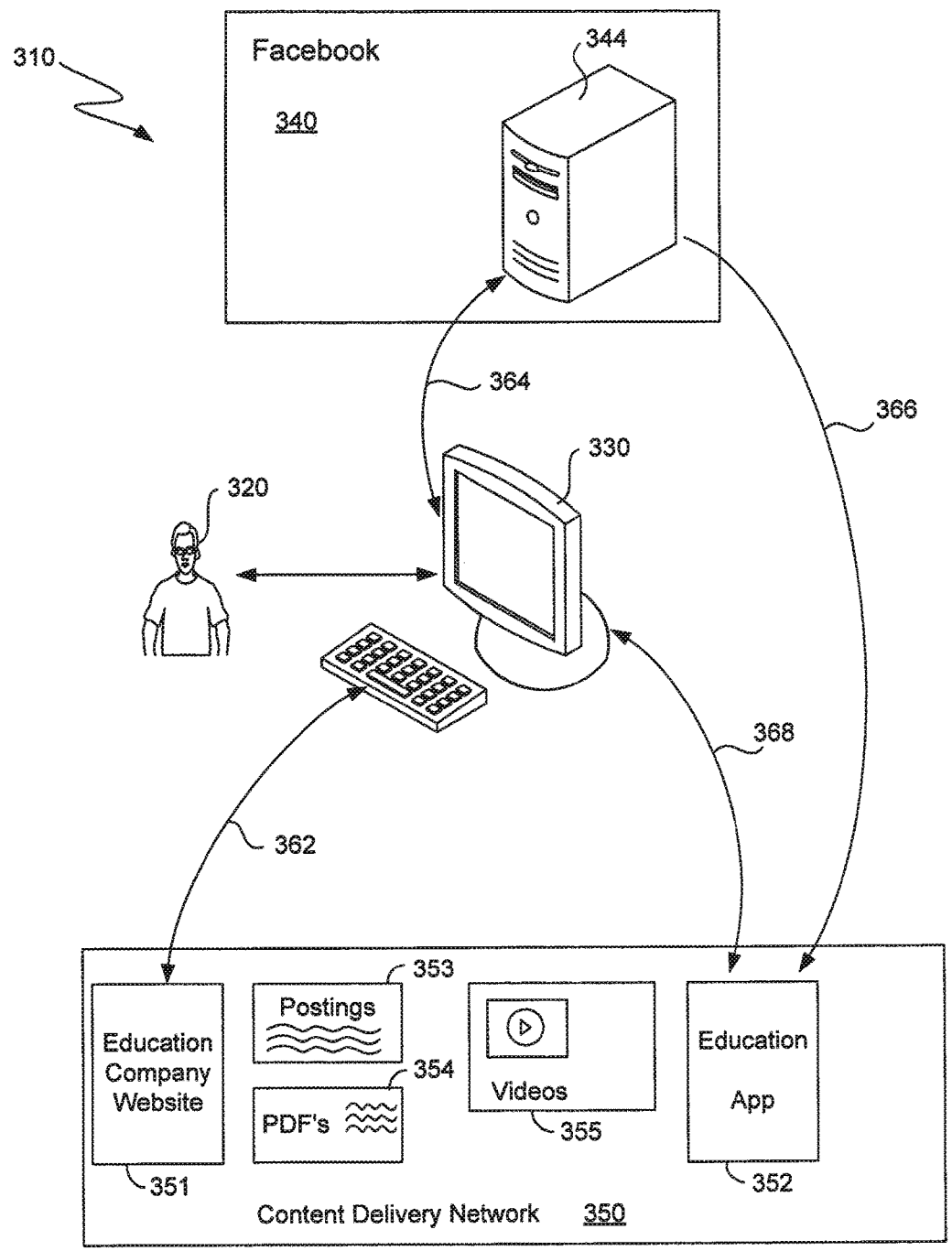
FIG. 3 is a block diagram of an authentication system according to one embodiment.

FIG. 3 is a block diagram of an authentication system according to one embodiment. Included is a user 320 interacting with a computer 330, such as any of devices 30 or 60 mentioned above. Also included is a variety of information hosted upon a content delivery network (CDN) 350. The CDN may be any of a variety of networks such as Akamai, Limelight, Amazon Web Services, etc., and the information need not be hosted upon a single one of these networks, but may be spread across different networks. Included is a Web site of the education company 351, an education application 352 (mentioned above), user postings 353 (e.g., textual comments, photographs, etc. commonly known as a "Wall"), PDF files 354 or any other type of electronic documents and files, and videos 355 such as videos from tutors or professors, videos of live classes, or other instructional videos. Education application 252 may include any or all of the modules and components of FIG. 2.

Preferably, any suitable streaming technique is used to deliver a video or document to the student's computing device. In this manner, the student is not provided with possession of the complete video or document (as if he or she had been able to download the video or document) and is not able to view a video or document as often as he or she likes for only one price. Because the video is being streamed, the education application may terminate the streaming if it is attempted after the actual time limit.

Facebook 340 is one example of any of a variety of third-party social media companies that may provide authentication services for the education company in order to authenticate any of its users. Computer server 344 is one or many computers under control of the third-party social media company that provides the authentication services. Of course, server 344 may be hosted on yet another content delivery network, yet still be under control of the third-party social media company.

Identification of Improbable Concurrent Classes

In order to detect that students are sharing accounts, a technique involves tracking the classes to which the students subscribe, the videos that a student is watching via their account, and also the types of electronic documents that a student is opening or downloading.

At a given university, some classes may be taken concurrently by a student, some classes may never be taken at the same time, some classes may not be taken at the same time unless an advisor grants an exception, and there may be some classes for which it is very improbable that they would be taken at the same time. Regarding the first category of classes that may be taken concurrently, it is generally assumed that classes may be taken concurrently unless a database shows that two classes may not be taken concurrently. Regarding the other groups of classes, the education application keeps lists or databases 264 of classes that may not or should not be taken together.

For example, a database of Tier 1 classes lists those classes that may never be taken at the same time, e.g., Calculus 1 cannot be taken in the same semester as Calculus 2 because the former is a prerequisite for the latter. Thus, a class that is a prerequisite for an advanced class may not be taken at the same time as the advanced class. A database of Tier 2 classes lists those classes that may not be taken at the same time unless an advisor provides an exception, e.g., because a student has failed a class necessary for a degree requirement, or has not earned the grade required for a degree requirement, and needs to take a class in a certain semester in order to remain eligible for degree requirements. An override of the above rule prohibiting classes being taken at the same time is performed by an administrator removing the block from an account after a student provides proof of schedule or proof of academic advisor exception.

A database of Tier 3 classes lists those classes for which it is extremely unlikely that the classes would be taken together, e.g., Pre Calculus and Organic Chemistry would not be taken in the same semester because the former is usually taken in the first year of school and the latter is usually taken in the second or third year. In another example, a list keeps track of which classes are taken in a particular year, thus, it would be odd to take at the same time a class normally taken in the freshman year along with a class normally taken in the senior year.

These courses can be manually categorized into tiers and entered into the system by staff. Also, staff scans the university course catalogue for pre-requisite courses and categorizes courses based upon the scanning. Analysis of reports and flagging of suspect accounts and students may be done automatically by computer.

FIG. 4 shows an example database of student classes that may be in conflict. In this example, column 404 lists unique identifiers for students, and columns 408 and 412 lists classes taken by a student that may be in conflict. Alternatively, column 404 may simply be an identifier for pairs of classes that may be in conflict, if a student were to take them together. Row 420 is an example of a Tier 1 violation (cannot take Physics 1 and Physics 2 at the same time), row 422 is a Tier 2 violation (cannot take Managerial Accounting and Financial Accounting at the same time), and row 424 is Tier 3 violation (unlikely that Pre Calculus and Organic Chemistry would be taken at the same time.

Figures 5, 6:
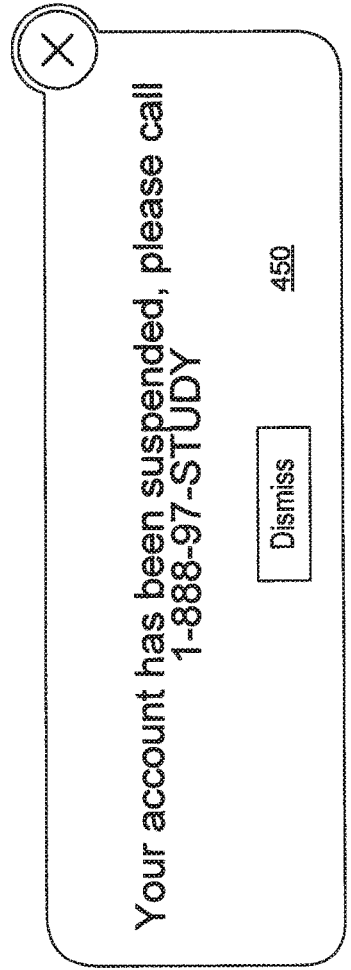
FIG. 5 is an example of a note in a database after a student has provided proof of advisor override.
FIG. 6 is an example of a message sent to a user computer when his or her account is blocked.

FIG. 5 shows an example of a note in a database after a student has provided proof of advisor override. Row 440 shows a student identifier, school, names of subjects enrolled in, course codes for classes actually enrolled in, and a note indicating that, even though this would normally be a Tier 2 violation, the database indicates that there should be an exception and that the student should be allowed to access education content associated with all of these classes.

In order to determine if a student is sharing an account, the online education application keeps track of the courses a student subscribes to and the videos a student is watching via his or her account under a given course. In addition, the application keeps track of which electronic documents (such as PDF files) a student is opening or downloading and identifies the course or courses associated with each PDF file. Because videos and study resources are organized under parent courses, these videos and resources are associated with the courses automatically.

The application then compares the courses associated with these videos and PDF files and determines if a student is watching videos from more than one course. If so, then the course codes associated with these courses are compared to the lists or databases described above. If it is determined that a particular student account is being used to watch videos or to open PDF documents associated with courses that are incompatible with one another, then that student account is flagged. An account will be flagged if videos are being watched in courses that are incompatible, if PDF files are opened for courses that are incompatible, or if a video and a PDF file indicate incompatible courses.

Each student account that is flagged will automatically generate a warning e-mail message that is sent to the owner of the account indicating that videos and PDF files are being viewed for incompatible classes, that a student account may not be shared with other students, and that future misuse will lead to being banned from the resource or the account being frozen or suspended. If at a later time, it is determined that videos and/or PDF files are still being viewed for incompatible classes, access to the student account may be blocked.

FIG. 6 is an example of a message sent to a user computer 30 when his or her account is blocked. At this time, user 320 will be prevented from accessing any content on CDN 350, for example. The student may be required to provide proof that they are in fact, taking these classes concurrently or have received an exception from an advisor.

FIG. 7 is an example from a school database showing a student's schedule. A record 460 in a database shows the entire student schedule for spring quarter, and column 462 shows the actual courses that a student is taking. A student may print this record and bring it to the education provider's offices, may e-mail it, or may display it to an administrator on a computing device. This database may also be accessed automatically by the education application 352 as explained below in order to confirm classes that the student is taking.

FIG. 8 is another example from a school database showing a student's schedule. A record 470 in a database shows the entire student schedule for spring quarter, and data 472 shows the actual courses that a student is taking in a given week. A student may print this record and bring it to the education provider's offices, may e-mail it, or may display it to an administrator on a computing device. This database may also be accessed automatically by the education application 352 as explained below in order to confirm classes that the student is taking. If no proof is provided or no response is received then the student account remains blocked and cannot be used to view videos or open PDF documents.

Another variation on this technique is to automatically access the student's registration for a semester at the university and gain access to a list of the actual courses that the student is taking that semester. Using a suitable API to access a university database of student records, the education application is able to retrieve the actual list of classes and/or class codes that a student is taking for a particular semester (as shown in FIGS. 7 and 8). If certain videos or PDF files viewed using a particular student account appear to indicate incompatible classes, these classes (or their class codes) may be compared against the actual list of classes taken from the university database. If the classes do appear in the database, then no action against the student account need be taken. If the incompatible classes do not appear in the list of classes, then a warning e-mail message may be sent as above. In another embodiment, a student is only able to access videos, study guides, and other resources that correspond to the courses that are in his university schedule. The list of student classes taken from the university database is similar to the student schedule image shown in FIGS. 7 and 8. Each resource in the database is ascribed to a particular course code, so it is easy to see if a video or PDF document accessed is from a course that is not in the student's actual schedule.

Another variation helps prevent account sharing between students at different universities. Each video and electronic document may be identified as being associated with a particular course at a particular university. A student signs into the application and identifies himself or herself as being associated with a certain university (or the information is pulled automatically from a university API once the student identifies himself or herself as an enrolled student at a given university). The student then begins accessing resources. The system records and tracks which resources are being consumed by the student. Should the student consume resources that do not correspond to a student's university or given course schedule, the system will flag the student's account. The student may be warned that he or she is consuming material that is not relevant to the student's course schedule, and the student's account may be frozen or disabled if the student continues to watch or consume resources that are irrelevant to the student's university or course schedule.

In another embodiment, a student is required to select a school when they first sign up or when they first purchase a membership. The student is henceforth associated with that school. They will only be allowed to view or use resources (e.g., videos, study guides, wall posts) from courses that are associated with that school. Their membership (and associated tokens) will not be valid for courses at a different school. If a student switches schools, their membership status and tokens are taken away upon entering the new school. If a student purchases a new membership at a new school, their membership at their old school is automatically cancelled. Students can only have one active membership, which can only be used at one school, at any given time. This prevents students from consuming resources at a school they do not currently attend.

Flow Diagram

Figure 9:
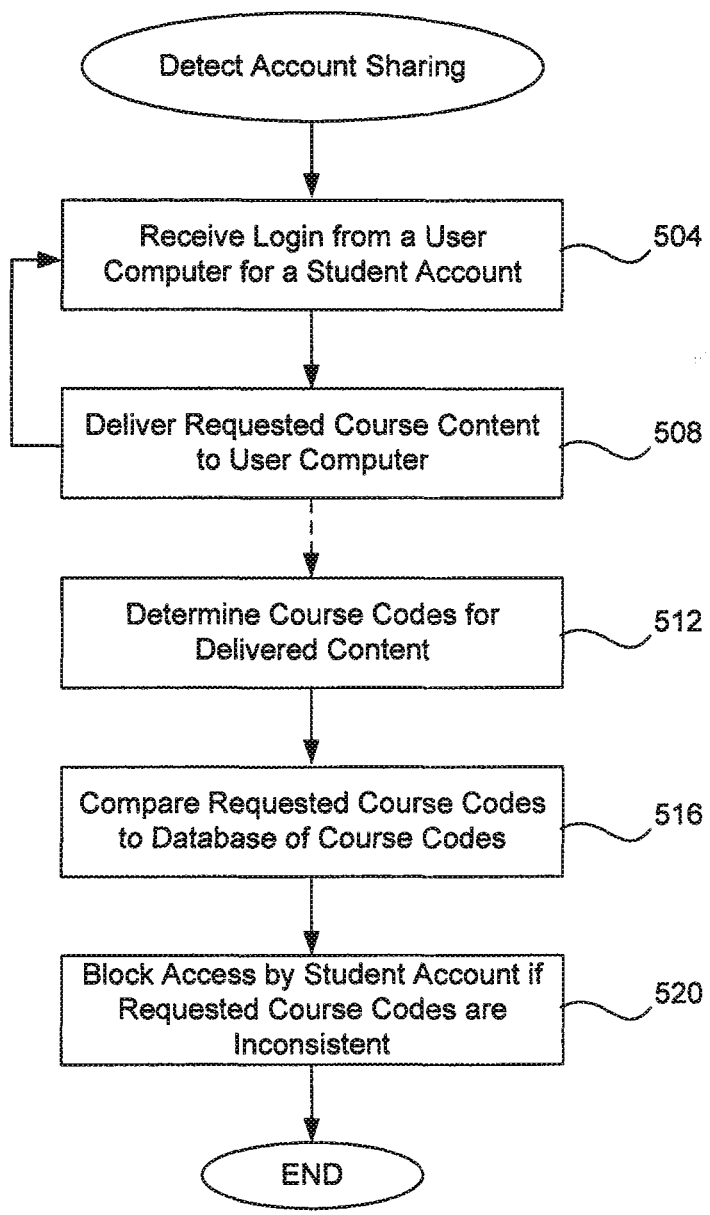
FIG. 9 is a flow diagram describing embodiments by which account sharing is detected.

FIG. 9 is a flow diagram describing embodiments by which account sharing is detected. In a first step 504, a login for a particular student account is received from a user computer and the student account is granted access to educational content on server 350 via the education application 352. At some point, the user will request educational content associated with a particular course such as videos 355, documents 354, and may wish to post or read information via postings 353. Accordingly, in step 508 the requested course content will be delivered to the user computer 330, which may be a user computer system 30 or a user mobile device 60. The user may then view any course content he or she wishes either at that time, or by logging out and logging in a future time. Of course, it is also possible that the student who is the actual owner of the student account will illicitly share the student account with another student and this other student will then login in step 504 and will view requested content in step 508. Both of the students may be using the same student account at the same time or at different times.

In step 512, the education application 352 may decide to check the courses that have been, or are being, viewed using a particular student account. This check in step 512 may occur periodically, may occur after the student account has been used for a particular period of time, or may occur each time that a user of the student account attempts to request educational content from CDN 350. As mentioned above, and as shown in FIGS. 5, 7 and 8, each educational course offered at a college or university has an associated course code, in addition to the actual course name, e.g., FIN3403 instead of "Finance." Each item of educational content (e.g., documents, videos, etc.) accessible by the education application has an associated course code. For example, if a student clicks on the video "Introduction to Finance," and that video is then downloaded or streamed to the student's device, the education application knows that the student has watched a video associated with course code FIN3403. In this step 512, the education application determines the course codes corresponding to the educational content that has been delivered to any user device over a previous time period while that device has been logged in using a particular student account.

Next, in step 516, these requested course codes that have been accessed via a particular student account are compared to a particular database of course codes. In a first embodiment, these course codes may be compared to a database such as that shown in FIG. 4 that has been created and managed by the education company. As explained above, this database indicates those courses that are incompatible. Thus, if any pairs of the requested course codes are found within this database this is a likely indication that a student account is being shared by two or more students.

Alternatively, in a second embodiment, these course codes are compared to a database such as either those shown in FIG. 7 or FIG. 8 that are created and managed by a college or university. While the database of FIG. 4 is created by the education company that manages the content delivery network and indicates incompatible courses, the database of FIG. 7 is created by the university where the student attends and indicates compatible courses. That is, the course codes 462 or 472 are compatible with one another in that these are the actual courses that a student is enrolled in and is permitted to take by the university. The education application first accesses an education network 40 using a suitable student identifier in order to access the student's course schedule 460 or 470 which is contained within a database of the student's university. If any of the requested course codes are not found within the student's course schedule 460 or 470, this is a likely indication that a student account is being shared by two or more students.

Accordingly, if in step 516 it is likely that a student account is being shared, then in step 520 the student account is blocked from accessing educational content from the content delivery network. The student may receive a warning first or access may be blocked immediately. When access is blocked, any person logging in using the student account will receive error message 450 (or similar) and will not be able to watch videos, view documents, or access postings, etc. If in 516 the course codes are compatible, then control may return to step 512 in order to loop back and check compatibility of course codes at a later time.

Watching More than One Long Video in a Short Time Period

Another technique detects whether a particular student account is used to watch more than one video in a short time period. If more than one video is being watched during a short time period (especially longer videos, i.e., "big videos") this may indicate that the student account is being shared or that a student is attempting to download the videos for later distribution to other students.

An automatic process of the education application tracks how many times during any one hour period that a particular student account is used to watch a relatively long video. Of course, activity may be tracked during a time shorter than one hour or longer than one hour. In one example, videos that require at least fifteen tokens to be viewed (typically, longer videos require more tokens) are considered "long" videos. The process flags student accounts in which three or more long videos are begun during any one-hour period. This automatic process tracks videos being watched in a particular student account by recording what is watched. Each time a student clicks on a video and agrees to use a set amount of tokens, e.g., 15, to watch the video this fact is recorded in the database. All of a student's views are recorded, and reports can be pulled on the student's viewing of videos.

Because these videos are typically longer than one hour, it would not make sense for a single person to open more than one of these videos in a one-hour time period. Moreover, because each of these videos requires a relatively large number of tokens (and expense) it is unlikely that anyone would innocently open these videos at the same time. Students also have to explicitly agree to watch longer videos that will take multiple tokens, making it further unlikely that a student will view long videos by mistake.

Figure 10:
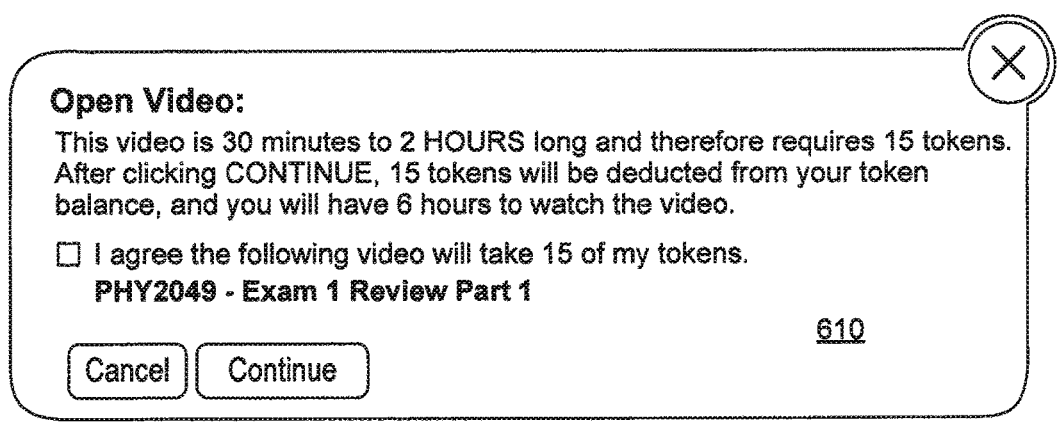
FIG. 10 is an example of a message that pops up when a student clicks on a video that requires multiple tokens.

FIG. 10 is an example of a message 610 that pops up when a student clicks on a video that requires multiple tokens. As shown, the message indicates the time length of the video and its cost. The student is required to click in order to indicate agreement.

The process will automatically generate a report regularly (e.g., weekly) indicating which student accounts have opened too many long videos in a particular time period. The users will receive a warning. Typically, as above, a warning may be sent by e-mail and the warning explains that student accounts or videos may not be shared. The student is also warned that future violations may result in the student account being blocked. If a violation occurs a second time, the account may be blocked and the student may be required to contact the education company (in person, online, etc.) in order to explain the circumstances.

Another variation allows for the education application to automatically block a user that has attempted to watch three long videos within a one-hour time period. The student would be required to contact the education company, either in person or by telephone, for instance, to explain this odd pattern of usage. If the usage is explained, the account is unfrozen. If the user does not contact the education company, the account will remain frozen.

FIG. 11 is a screenshot of a database of a report of videos watched in various student accounts. Field 620 is a timestamp (date and time), field 622 is a unique identifier per student of a student account, field 624 is a student name, field 626 is the school at which the student attends, field 628 is the name of the video or PDF file viewed, field 630 indicates what type of file (or length of video), field 632 indicates the number of tokens used on the listed file, followed by the number of tokens remaining in the student's account. Records 634 indicate three large videos watched by a single student (or from a single student account) over the course of a week. Even if the threshold for length of video is exceeded by these videos, and the threshold for number of videos is three, the time period is typically on the order of hours. Because these three were watched over one week, it is unlikely that this indicates fraud. Even though two videos were watched on April 1, and both started within one hour, this will not be fraud if the threshold for quantity is three. In addition, this is the same video; it is possible that the student watched the same video twice.

FIG. 12 is a screenshot 650 of a database of an example of a student who was caught watching three videos in a one-hour time frame. Field 660 is a timestamp (date and time), field 662 is a unique identifier per student of a student account, field 664 is a student name, field 666 is the school at which the student attends, field 668 is the name of the video or PDF file viewed, field 670 indicates what type of file (or length of video), field 672 indicates the number of tokens used on the listed file, followed by the number of tokens remaining in the student's account. Shown are three records for a particular student indicating that on the same date this student (supposedly) started watching three different videos within a time span of about fourteen minutes, each having a length of at least one hour. In this example, the thresholds for possible fraud are as follows: at least three videos, each video is at least one hour long, and the time period is one hour less. Because this particular student account was used to start three videos of at least one hour within a time period of less than one hour account sharing is suspected, and a warning may be issued to the student who owns the account or the account may be blocked from further access to any of the educational content.

Flow Diagram

Figure 13:
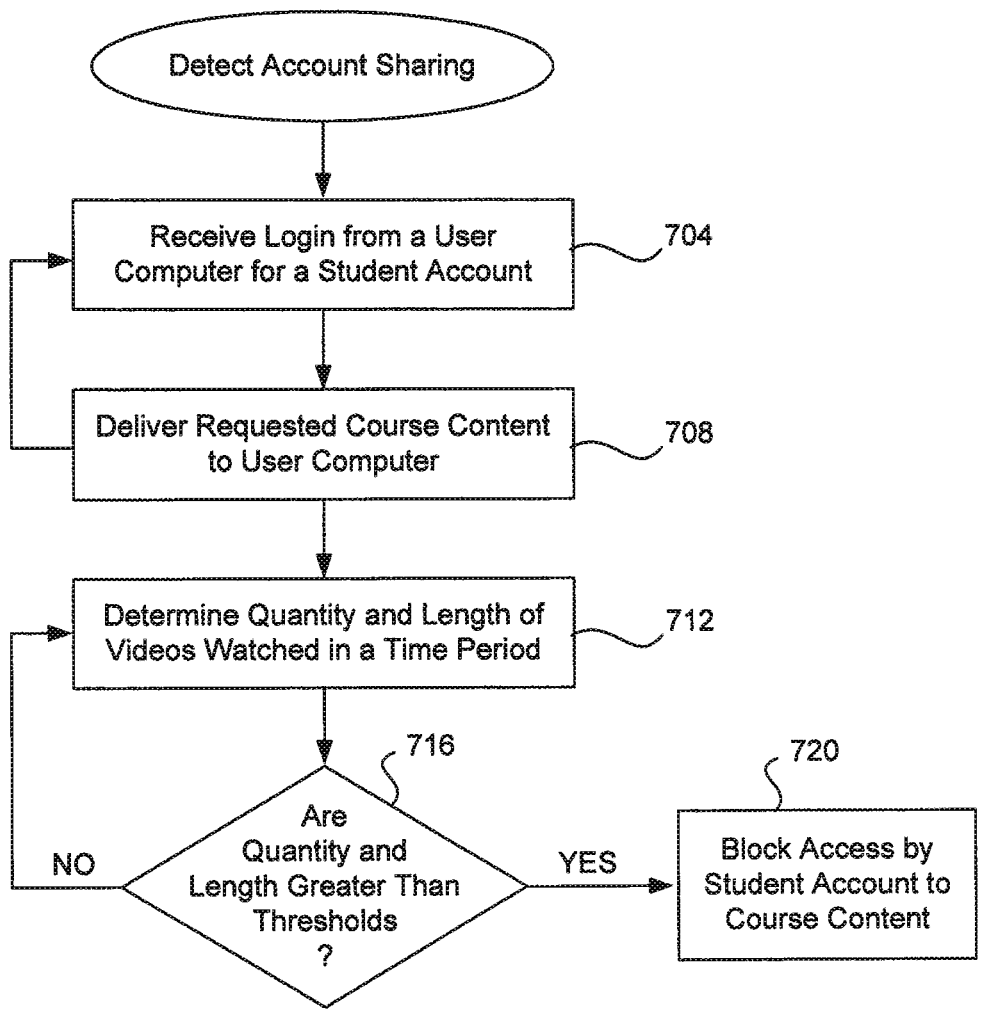
FIG. 13 is a flow diagram describing an embodiment in which account sharing is detected.

FIG. 13 is a flow diagram describing an embodiment in which account sharing is detected. In a first step 704, a login for a particular student account is received from a user computer and the student account is granted access to educational content on server 350 via the education application 352. At some point, the user will request educational content associated with a particular course such as videos 355, documents 354, and may wish to post or read information via postings 353. Accordingly, in step 708 the requested course content will be delivered to the user computer 330, which may be a user computer system 30 or a user mobile device 60. The user may then view any course content he or she wishes either at that time, or by logging out and logging in a future time. Of course, it is also possible that the student who is the actual owner of the student account will illicitly share the student account with another student and this other student will then login in step 704 and will view requested content in step 508. Both of the students may be using the same student account at the same time or at different times.

In step 712, the education application 352 may decide to review the videos that have been, or are being, viewed using a particular student account. This check in step 712 may occur periodically, may occur after the student account has been used for a particular period of time, or may occur in real time each time that a user of the student account attempts to request educational content from CDN 350. As mentioned above, and as shown in FIGS. 11 and 12, the education application 352 keeps track of videos that have been watched in a database and is able to review this information at any time.

Accordingly, each student account is reviewed to determine the quantity of videos that have been (or are being) watched and the length of videos that have been (or are being) watched in a particular time period. This time period may be a time period from the past or may be a currently, ongoing time period. Typically, if a student account initiates at least three long videos in a short time period then fraud may be suspected. For example, a long video may be considered a video of at least one hour, and the time period may also be one hour.

In another example, the threshold quantity of videos is two and a second video should not be started before the first one is over. Consider a four-hour review session broken into two equal parts. There is no reason why a legitimate user would start the second part of the review session less than two hours after the first part has been started. Or, why would a single student start watching a chemistry review session less than one hour after a one-hour finance review session has begun? Note that this analysis is unique in the context of education, taking into account the observation that a student has a strong motivation and incentive to watch an entire review session before starting another. In the context of entertainment movies, by contrast, it is far more likely that a student may stop watching a full-length movie after 15 minutes and then start watching another one because the first may have been low quality.

In step 716 it is determined whether a certain threshold quantity of videos having a certain minimum length have been watched (or started) within a particular time period any time in the past (or currently). If not, then control returns to step 712 and the education application may review another student account, may pause processing, or may contain to monitor any videos started by any student account.

If the threshold has been met, then it is likely that a student account is being shared, and in step 720 the student account is blocked from accessing educational content from the content delivery network. The student may receive a warning first or access may be blocked immediately. When access is blocked, any person logging in using the student account will not be able to watch videos, view documents, or access postings, etc.

Alternatively, the education application can simply hide certain videos so that a user cannot access videos that are not relevant to what he or she is watching at a given moment in time. For example, while a user is watching part 1 (or any earlier part) of a review, all subsequent parts would be inaccessible. Or, while a student account is currently engaged in watching any video on any device, access to any other video would be prohibited from that student account. These techniques would prevent account sharing in the first place, rather than detect it.

Computer System Embodiment

Figure 14:
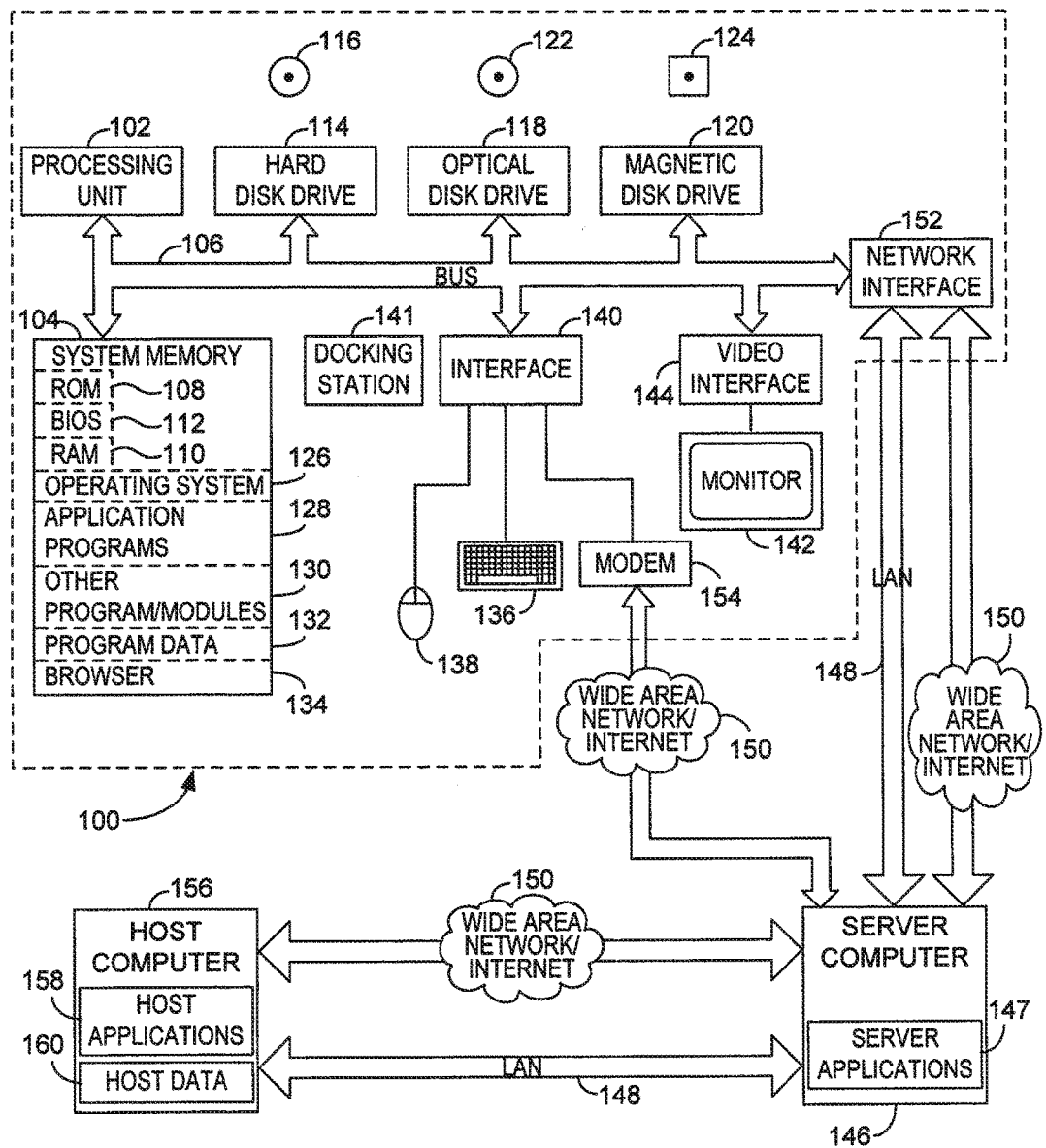
FIG. 14 illustrates a computer system suitable for implementing embodiments of the present invention.

FIG. 14 in cooperation with the above provides a general description of a computing environment that may be used to implement various aspects of the present invention. For purposes of brevity and clarity, embodiments of the invention may be described in the general context of computer-executable instructions, such as program application modules, objects, applications, models, or macros being executed by a computer, which may include but is not limited to personal computer systems, hand-held devices, multiprocessor systems, microprocessor-based or programmable consumer electronics, network PCs, mini computers, mainframe computers, and other equivalent computing and processing sub-systems and systems. Aspects of the invention may be practiced in distributed computing environments where tasks or modules are performed by remote processing devices linked through a communications network. Various program modules, data stores, repositories, models, federators, objects, and their equivalents may be located in both local and remote memory storage devices.

By way of example, a conventional personal computer, referred to herein as a computer 100, includes a processing unit 102, a system memory 104, and a system bus 106 that couples various system components including the system memory to the processing unit. The computer 100 will at times be referred to in the singular herein, but this is not intended to limit the application of the invention to a single computer since, in typical embodiments, there will be more than one computer or other device involved. The processing unit 102 may be any logic processing unit, such as one or more central processing units (CPUs), digital signal processors (DSPs), application-specific integrated circuits (ASICs), etc.

The system bus 106 can employ any known bus structures or architectures, including a memory bus with memory controller, a peripheral bus, and a local bus. The system memory 104 includes read-only memory ("ROM") 108 and random access memory ("RAM") 110. A basic input/output system ("BIOS") 112, which can form part of the ROM 108, contains basic routines that help transfer information between elements within the computer 100, such as during start-up.

The computer 100 also includes a hard disk drive 114 for reading from and writing to a hard disk 116, and an optical disk drive 118 and a magnetic disk drive 120 for reading from and writing to removable optical disks 122 and magnetic disks 124, respectively. The optical disk 122 can be a CD-ROM, while the magnetic disk 124 can be a magnetic floppy disk or diskette. The hard disk drive 114, optical disk drive 118, and magnetic disk drive 120 communicate with the processing unit 102 via the bus 106. The hard disk drive 114, optical disk drive 118, and magnetic disk drive 120 may include interfaces or controllers (not shown) coupled between such drives and the bus 106, as is known by those skilled in the relevant art. The drives 114, 118, 120, and their associated computer-readable media, provide nonvolatile storage of computer readable instructions, data structures, program modules, and other data for the computer 100. Although the depicted computer 100 employs hard disk 116, optical disk 122, and magnetic disk 124, those skilled in the relevant art will appreciate that other types of computer-readable media that can store data accessible by a computer may be employed, such as magnetic cassettes, flash memory cards, digital video disks ("DVD"), Bernoulli cartridges, RAMs, ROMs, smart cards, etc.

Program modules can be stored in the system memory 104, such as an operating system 126, one or more application programs 128, other programs or modules 130 and program data 132. The application programs 128, program or modules 130, and program data 132 may include information, instructions and parameters for creating, manipulating, scoring, ranking, uploading, and processing information to determine a best-fit match between students and tutors, to determine a certification of a tutor, provide filtering by a course code, etc. The system memory 104 may also include a browser 134 for permitting the computer 100 to access and exchange data with sources such as Web sites of the Internet, corporate intranets, or other networks as described above, as well as other server applications on server computers such as those further discussed above. In one embodiment, the browser 134 may be used to access course materials, view a tutor profile, and share information (e.g., questions or comments) with a tutor or otherwise build-up databases of information that may be customized for a variety of purposes in a learning environment. The browser 134 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. Although the depicted embodiment shows the computer 100 as a personal computer, in other embodiments, the computer is some other computer-related device such as a tablet, a television, a personal data assistant (PDA), a mobile telephone (or other mobile device).

The operating system 126 may be stored in the system memory 104, as shown, while application programs 128, other programs/modules 130, program data 132, and browser 134 can be stored on the hard disk 116 of the hard disk drive 114, the optical disk 122 of the optical disk drive 118, and/or the magnetic disk 124 of the magnetic disk drive 120. A user can enter commands and information into the computer 100 through input devices such as a keyboard 136 and a pointing device such as a mouse 138. Other input devices can include a microphone, joystick, game pad, scanner, etc. These and other input devices are connected to the processing unit 102 through an interface 140 such as a serial port interface that couples to the bus 106, although other interfaces such as a parallel port, a game port, a wireless interface, or a universal serial bus ("USB") can be used. Another interface device that may be coupled to the bus 106 is a docking station 141 configured to receive and electronically engage a digital pen or stylus for the purpose of data transmission, charging, etc. A monitor 142 or other display device is coupled to the bus 106 via a video interface 144, such as a video adapter. The computer 100 can include other output devices, such as speakers, printers, etc.

The computer 100 can operate in a networked environment using logical connections to one or more remote computers, such as a server computer 146. The server computer 146 can be another personal computer, a server, another type of computer, or a collection of more than one computer communicatively linked together and typically includes many or all the elements described above for the computer 100. The server computer 146 is logically connected to one or more of the computers 100 under any known method of permitting computers to communicate, such as through a local area network ("LAN") 148, or a wide area network ("WAN") or the Internet 150. Such networking environments are well known in wired and wireless enterprise-wide computer networks, intranets, extranets, and the Internet. Other embodiments include other types of communication networks, including telecommunications networks, cellular networks, paging networks, and other mobile networks. The server computer 146 may be configured to run server applications 147.

When used in a LAN networking environment, the computer 100 is connected to the LAN 148 through an adapter or network interface 152 (communicatively linked to the bus 106). When used in a WAN networking environment, the computer 100 often includes a modem 154 or other device, such as the network interface 152, for establishing communications over the WAN/Internet 150. The modem 154 may be communicatively linked between the interface 140 and the WAN/Internet 150. In a networked environment, program modules, application programs, or data, or portions thereof, can be stored in the server computer 146. In the depicted embodiment, the computer 100 is communicatively linked to the server computer 146 through the LAN 148 or the WAN/Internet 150 with TCP/IP middle layer network protocols; however, other similar network protocol layers are used in other embodiments. Those skilled in the relevant art will readily recognize that the network connections are only some examples of establishing communication links between computers, and other links may be used, including wireless links.

The server computer 146 is further communicatively linked to a legacy host data system 156 typically through the LAN 148 or the WAN/Internet 150 or other networking configuration such as a direct asynchronous connection (not shown). Other embodiments may support the server computer 146 and the legacy host data system 156 on one computer system by operating all server applications and legacy host data system on the one computer system. The legacy host data system 156 may take the form of a mainframe computer. The legacy host data system 156 is configured to run host applications 158, such as in system memory, and store host data 160 such as business related data.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting account sharing, said method comprising:
   receiving login information for a student account from a first computing device, wherein streaming video of a server computer being available to any computing device logged in using said login information of said student account;
   delivering a first streaming video from said server computer having a first course code that identifies a first course subject to said first computing device while said first computing device is logged in under said student account, said first streaming video not being downloaded to said first computing device;
   receiving login information for said student account from a second computing device;
   delivering a second streaming video from said server computer having a second course code that identifies a second course subject to said second computing device while said second computing device is logged in under said student account, said second streaming video not being downloaded to said second computing device;
   comparing said first and second course codes to a database of incompatible course subjects; and
   blocking further delivery of streaming video from said server computer to any computing device while logged in under said student account when it is determined that said first and second course codes are incompatible.

2. A method as recited in claim 1 wherein said first computing device is logged in under said student account during a different time when said second computing device is logged in under said student account.

3. A method as recited in claim 1 further comprising:
   comparing said first and second course codes to pairs of course codes in said database.

4. A method as recited in claim 1 wherein said first and second course codes are incompatible when courses corresponding to said first and second course codes may not be taken at the same time.

5. A method as recited in claim 1 wherein said first computing device and said second computing device are the same.

6. A method as recited in claim 1 wherein said streaming video, and said first and second streaming videos are educational videos.

7. A method of detecting account sharing, said method comprising:
   receiving login information for a student account from a first computing device, said student account belonging to a student, wherein streaming video of a server computer being available to any computing device logged in using said login information of said student account;
   delivering a streaming video from said server computer having a first course code that identifies a first course subject to said first computing device while said first computing device is logged in under said student account, said streaming video not being downloaded to said first computing device;
   accessing a database of an educational institution in order to retrieve a list of course codes currently enrolled in by said student;
   comparing said first course code to said list of course codes currently enrolled in; and
   blocking further delivery of streaming video from said server computer to any computing device while logged in under said student account when it is determined that said first course code is not present within said list of course codes.

8. A method as recited in claim 7 further comprising:
   accessing, from a first server computer using an API of said educational institution, a second server computer of said educational institution in order to retrieve said list.

9. A method as recited in claim 7 wherein said streaming video is educational video.

10. A method of detecting account sharing, said method comprising:
    streaming at least a threshold number of videos from a server computer to any computing device logged in under a single student account, wherein streaming video from said server computer being available to said any computing device logged in using login information of said single student account, and wherein said streamed threshold number of videos not being downloaded to said any computing device;
    accessing a database of a computer indicating videos watched or being watched, each record of said database indicating a video, a timestamp, a student account, and a length of said video;
    determining said threshold number of videos, a minimum length of a video, and a time period;
    determining using said records of said database, if during said time period, at least said threshold number of videos each having said minimum length were initiated by said single student account; and
    blocking delivery of streaming video from said server computer to any computing device while logged in under said single student account when it is determined that at least said threshold number of videos were initiated by said single student account.

11. A method as recited in claim 10 wherein said threshold number of videos is three.

12. A method as recited in claim 10 wherein said threshold number of videos is two, and wherein said time period is less than the length of the first video initiated by said single student account.

13. A method as recited in claim 10 wherein said streaming video and said at least a threshold number of videos are educational videos.

14. A method of detecting account sharing, said method comprising:
    receiving login information for a student account from a first computing device, wherein streaming video of a server computer being available to any computing device logged in using said login information of said student account;
    delivering via streaming from said server computer a first video to said first computing device while logged in under said student account, wherein said streamed first video not being downloaded to said first computing device;
    receiving login information for said student account from a second computing device;
    delivering via streaming from said server computer a second video to said second computing device while logged in under said student account, wherein said streamed second video not being downloaded to said second computing device;

determining that said first and second videos each have a predetermined minimum length, and that, during a predetermined time period, said streaming of said first and second videos was initiated while logged in under said student account; and blocking delivery of streaming video from said server computer to any computing device while logged in under said student account when it is determined that said streaming of said first and second videos was initiated while logged in under said student account during said predetermined time period.

15. A method as recited in claim 14 wherein said predetermined time period is less than the length of said first video.

16. A method as recited in claim 14 wherein said streaming video, and said first and second streaming videos are educational videos.

\* \* \* \* \*